United States Patent [19]

MacKenzie

[11] 4,268,282

[45] May 19, 1981

[54] WORK BENCH WITH SELF-CONTAINED AIR CLEANER

[75] Inventor: Harold L. MacKenzie, Etobicoke, Canada

[73] Assignee: Riverwood Enterprises & Manufacturing, Ltd., Toronto, Canada

[21] Appl. No.: 95,212

[22] Filed: Nov. 19, 1979

[51] Int. Cl.[3] .......................... B03C 3/04; B01D 50/00

[52] U.S. Cl. .......................................... 55/101; 55/126; 55/472; 55/481; 55/DIG. 18; 55/484; 98/115 R

[58] Field of Search ............. 55/124, 126, 350, 385 A, 55/472, 481, 484, DIG. 18, DIG. 29, 101; 98/115 R, 115 LH; 118/DIG. 7; 219/401

[56] References Cited

U.S. PATENT DOCUMENTS

| | | | |
|---|---|---|---|
| 2,184,354 | 12/1939 | Levine | 55/484 |
| 2,486,520 | 11/1949 | Dahlman | 55/126 |
| 2,602,417 | 7/1952 | Medcalf | 55/DIG. 18 |
| 3,336,855 | 8/1967 | Messina | 55/DIG. 29 |
| 3,368,523 | 2/1968 | Becker | 55/472 |
| 3,626,669 | 12/1971 | Cardiff | 55/126 |
| 3,757,495 | 9/1973 | Sievers | 55/472 |

*Primary Examiner*—David L. Lacey
*Attorney, Agent, or Firm*—Fetherstonhaugh & Co.

[57] ABSTRACT

A work bench and air filter unit are combined in the present invention in a compact configuration by locating two or more air filter units below a work bench and arranging two or more air filter units in parallel with an extraction fan. An improved extraction efficiency is achieved by providing an enclosure located above the work bench wherein the back wall of the enclosure is angularly inclined forwardly at an angle of about 75° with respect to the work platform, an air extraction slot being formed in the back wall communicating with an air plenum which is disposed rearwardly of the back wall through which air is withdrawn from the enclosure.

7 Claims, 3 Drawing Figures

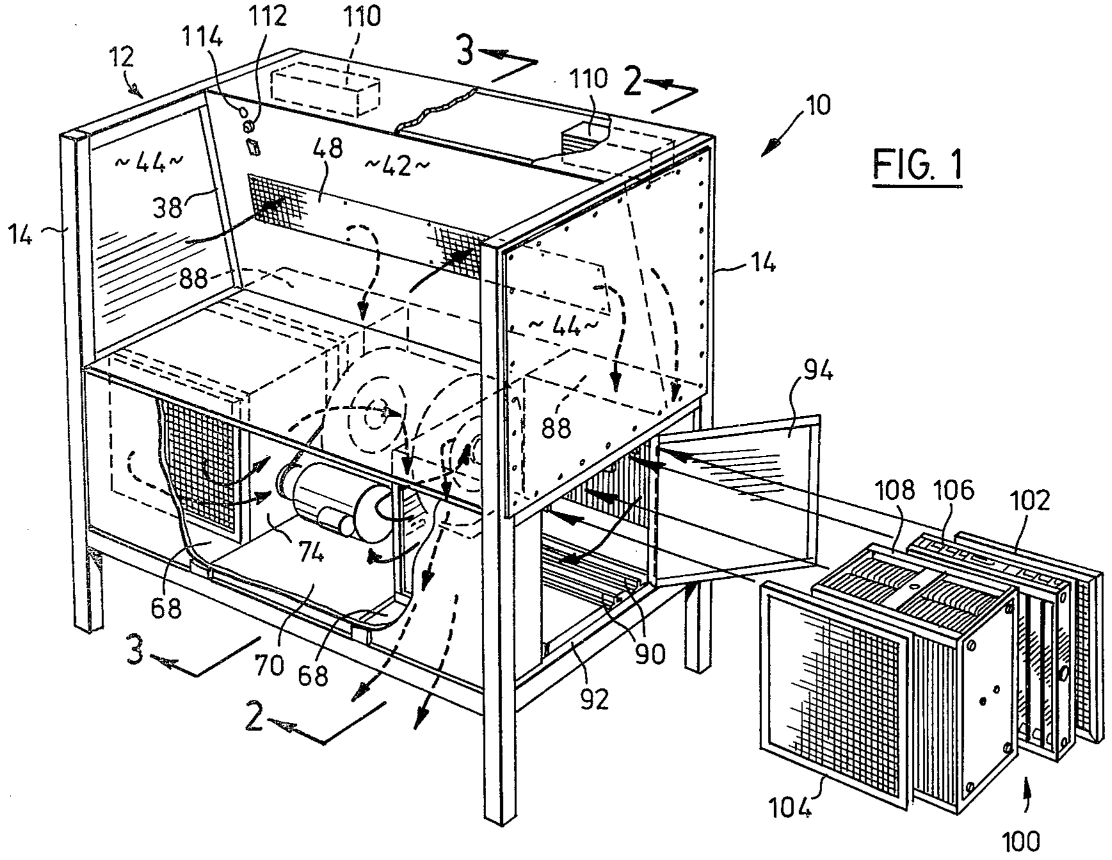
FIG. 1
FIG. 2
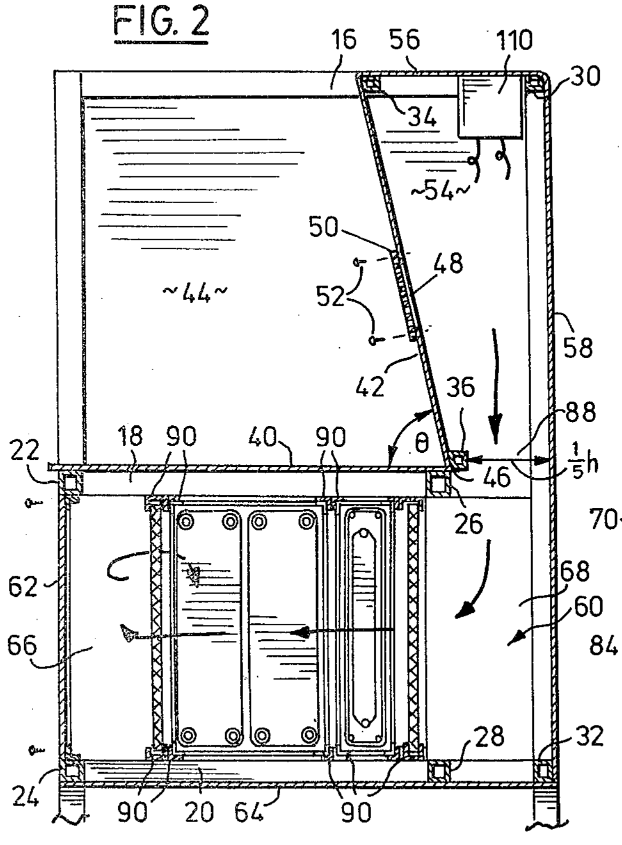
FIG. 3
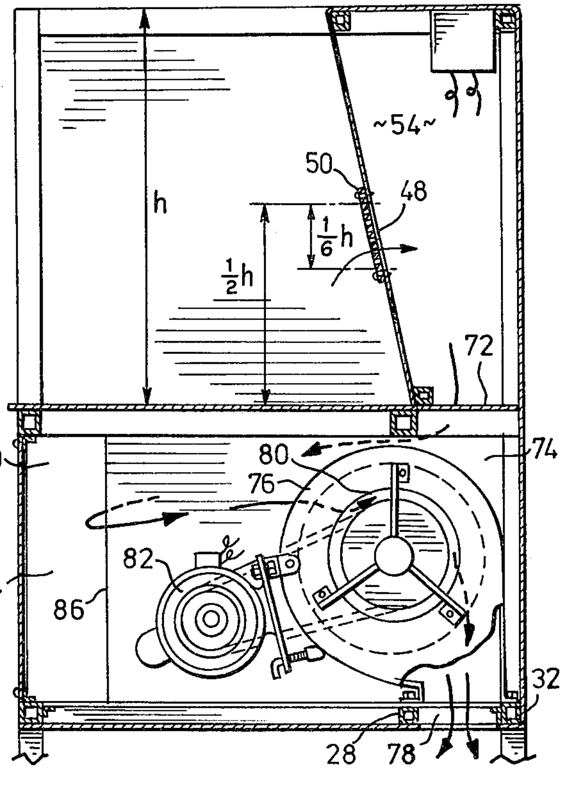

WORK BENCH WITH SELF-CONTAINED AIR CLEANER

FIELD OF INVENTION

This invention relates to work benches and air cleaning and filtering systems for use in association therewith. In particular, this invention relates to an improved work bench which incorporates a self-contained air cleaning system.

PRIOR ART

In numerous operations such as welding operations, fumes are generated in the proximity of the work site and it is desirable to remove these fumes as quickly as possible from the work site. With this objective in mind, numerous air extraction systems have been proposed for removing contaminated air from a work site of a work bench.

In a work bench intended for use in a welding operation, it is customary to provide a back wall and a pair of side walls which project upwardly from the back edge and side edges of the work platform to form a side screen to minimize direct glare from the welding operation. In one previous proposal, a vent passage has been formed in the vertically oriented back wall of the side screen and an air filter unit has been mounted below the work platform. An air plenum has been provided to connect the vent passage to the air filter unit.

In this previous proposal, the efficiency with which the contaminated air is withdrawn from the job site is limited with the result that it has been necessary to provide a relatively high powered air extraction device. Furthermore, the air filter unit and extraction device have been arranged to extend from the back of the work bench to the front of the work bench with the filter and extraction fan arranged in series and located centrally between the side edges of the platform. As a result, the extraction unit has tended to extract contaminated air from the center of the length of the platform and has not provided a substantially uniform extraction of air along the length of the work bench.

In these previous proposals, the end product was in effect a standard work bench modified to incorporate a standard air filtration unit with the result that the proportions of the end product were dictated by the combined proportions of the bench and the air filtration unit. This previous combination provided a very bulky device which occupied considerably more floor space than that required for a conventional work bench.

I have found that a much more compact work bench and air filter unit combination can be provided by locating the air filter units below the work bench and arranging the air filter units in parallel. I have also found that the efficiency with which air can be extracted from the work site can be substantially improved by ensuring that the back wall of the enclosure which is formed about the platform is upwardly and forwardly inclined at an angle in the range of 70° to 80° with respect to the work platform.

SUMMARY OF INVENTION

According to one aspect of the present invention, a work bench comprises a frame, a work platform supported by said frame at a predetermined work height in a generally horizontal plane, said work platform having a pair of oppositely disposed end edges, a front edge and a back edge, the front and back edges extending longitudinally between the end edges, a platform enclosure comprising a first back wall projecting upwardly and forwardly from said back edge of said platform and side walls projecting upwardly from each end edge of said platform, said first back wall being inclined forwardly with respect to the work platform at an angle in the range of 70° to 80°, a vent passage opening through said first back wall, said vent passage being spaced a substantial distance above said work platform and extending longitudinally of said first back wall along a major portion of the length thereof, an air filter chamber disposed below said work platform and extending longitudinally between the end edges of the platform, said chamber having at least two filter compartments arranged at longitudinally spaced intervals along said chamber, said filter compartments being spaced from one another by an air extraction compartment, each of said filter compartments having an input passage opening therefrom at said back edge of said work platform, said air extraction compartment having a discharge passage opening outwardly therefrom, an air plenum disposed rearwardly from said first back wall and communicating between said vent passage and said input passages of said filter compartments, an air filter unit removably mounted in each filter compartment, each air filter unit having an input end connecting with the input passage of the compartment in which it is housed and an outlet passage communicating with said air extraction compartment, an air extraction unit mounted in said air extraction compartment and operable to extract air from within said platform enclosure through said vent passage and through said filter units in parallel to discharge through said discharge passage of said extraction compartments.

PREFERRED EMBODIMENT

The invention will be more clearly understood with reference to the following detailed specification read in conjunction with the drawings, wherein FIG. 1 is a partially sectioned pictorial view of a work bench constructed in accordance with one aspect of the present invention;

FIG. 2 is a cross-sectional view of the bench of FIG. 1 taken along the line 2—2 of FIG. 1;

FIG. 3 is a cross-sectional view of the bench of FIG. 1 taken along the line 3—3 of FIG. 1.

With reference to the drawings, the reference numeral 10 refers generally to a work bench of a type suitable for use in a welding operation or the like. The work bench consists of a tubular frame generally identified by reference numeral 12. The frame includes four vertically oriented support legs 14 which are connected by front to back support rails 16, 18 and 20 and longitudinally extending front rails 22 and 24, intermediate back rails 26 and 28 and back rails 30 and 32. The legs and rails are preferably box section steel members of substantial strength. A first back wall support is provided by means of additional rails 34 and 36 which extend longitudinally and which are connected at opposite ends by means of rails 38 which are upwardly and forwardly inclined.

A work platform 40 is supported by the rails 18, 22 and 26 in a generally horizontal plane at a predetermined work height which is appropriate to the task to be performed thereon.

A platform enclosure is formed above the platform 40 and consists of a first back wall 42 and a pair of side walls 44. The first back wall 42 extends upwardly from the back edge 46 of the platform to a height 'h' at an angle $\theta$. The angle $\theta$ is in the range of 70° to 80° and which is preferably in the range of 74° to 77° with the preferred angle being 75.0°. The height 'h' of the first back wall 42 is substantially equal to the front to back width of the platform 40. A vent passage 48 opens through the first back wall 42 and has its upper edge disposed at a height 0.5h and extends longitudinally thereof over a length which is in the range of 2 to 2.5h. The vent passage 48 preferably has a height in the plane of the back wall 42 of about 1/6h. A coarse mesh screen 50 is secured over the vent passage 48 by means of suitable mounting screws 52 or the like.

An air plenum, generally identified by the reference numeral 54, is located rearwardly of the vent passage 48. The air plenum 54 has a top wall 56. A second back wall 58 forms a back wall of the plenum 54 and the end walls 44 close opposite ends of the air plenum 54. The rail 36 is spaced from the back wall 58 a distance equal to about 1/5h to form transfer passages opening from the plenum 54. These proportions have been found to provide for most efficient extraction of air from the work enclosure under a minimum static pressure of 0.7" water column in the plenum.

An air filter chamber 60 is formed below the platform 40. The air filter chamber 60 is enclosed by the platform 40, the second back wall 58, front wall 62, bottom wall 64 and a pair of end walls 66. The air filter chamber extends longitudinally between the end walls 66 and has two filter compartments 68 separated from one another by an air extraction compartment 70. The air extraction compartment 70 is isolated from the air plenum 54 at its back end by means of an upper divider wall 72 and a pair of oppositely disposed end walls 74. These walls prevent air from being drawn directly into the air extraction compartment 70 from the air plenum 54.

An air extraction fan 76 is located within the air extraction compartment 70 and has its feet mounted on the longitudinal supports 28 and 32. A discharge passage 78 opens downwardly from the compartment 70 and communicates with the discharge of the fan 76. The fan 76 has intake passages 80 at opposite ends thereof. The fan 76 is driven by an electric motor 82 which is supported by the fan housing in a conventional manner.

A passage 84 is formed between the front edge 86 of each side wall 74 to provide communication between the air extraction compartment 70 and the air filter compartments 68.

The air filter compartments 68 communicate directly with the air plenum 54 through passages 88. A plurality of support rails 90 are mounted in the top and bottom of each air filter compartment 68 and extend inwardly from opposite ends of the frame. An access passage 92 opens into each of the air filter compartments 68 at each end of the frame and a closure door 94 is provided for opening and closing the access passage 92 as required in use. An air filtration unit, generally identified by the reference numeral 100, is removably mountable in each air filter compartment by means of the support rails 90. Each air filter unit 100 consists of filter screens 102 and 104 and electrostatic precipitator components 106 and 108.

The filter units 102 and 104 and the electrostatic precipitators 106 and 108 may be inserted into and withdrawn from the filter chambers by sliding them along the guide rails 92 in the direction of the arrows indicated in FIG. 1.

High voltage power supply units 110 are conveniently housed within the upper end of the air plenum 54 with an ON/OFF control switch 112 and indicator light 114 being provided on the front face of the first back wall 42.

In use, when the air filter units 100 are installed as previously described, the electric motor 82 may be activated by the ON/OFF control switch 112 to drive the extraction fan 76. By activating the extraction fan 76, air is drawn from within the enclosure formed above the work platform through the vent passage 48 into the plenum 54. Air is withdrawn from the plenum 54 through the passages 88 into both air filter compartments 68. The air is then drawn successively through the filter screen 102, electrostatic precipitator units 106 and 108, and the filter screen 104. The air is then withdrawn from both air filter compartments 68 into the centrally located air extraction compartment 70, through the passages 84. The air is then drawn through the fan 76 and discharged through discharge passage 78. During passage of the air through the air filter units, the air may be filtered and cleaned to a sufficient extent to permit it to be returned to the work environment.

It has been found that by locating the air filtration compartments one on either side of an air extraction compartment, air can be drawn very efficiently away from the platform enclosure along substantially the full length of the enclosure. In addition, it has been found that this configuration permits the use of a lower rated air extraction fan with a resultant saving in energy consumption. In addition, by providing a plurality of air filter chambers arranged in parallel with the extraction chamber, it is possible to maintain the front to back depth of the work bench at a depth which is not significantly greater than that required for a work bench which does not include an air extraction unit. This is in direct contrast to previous proposals in which the air extraction unit and air filter units were arranged in series in a front to back relationship which resulted in a very substantial increase in the front to back proportions of a work bench.

It has also been found that the efficiency of air extraction from the work site is substantially improved by angularly inclining the first back wall 42 in the manner described. These and other advantages of the apparatus of the present invention will be apparent to those skilled in the art.

Various modifications of the present invention will be apparent to those skilled in the art. For example, if a very long work bench is required, one or more additional filter and extraction assemblies may be provided in a side-by-side relationship along the length of the bench, thus repeating the arrangement of filter units and filter extraction units at intervals along the length of the bench.

In a further modification in which the extraction requirements are not great, a single air filter unit may be located centrally of the length of the bench in the position occupied by the air extraction compartment of the preferred embodiment illustrated in FIG. 1 with the air extraction unit being located to one side thereof in the space occupied by an air filter unit of the preferred embodiment. In this arrangement, the air would again be extracted from the air plenum through a passage communicating with one end of the air filter unit and be drawn through the air filter unit before entering the air extraction compartment to be discharged by the extraction motor.

These and other modifications of the present invention will be apparent to those skilled in the art.

What I claim as my invention is:

1. A work bench comprising, (a) a frame, (b) a work platform supported by said frame at a predetermined work height in a generally horizontal plane, said work platform having a pair of oppositely disposed end edges, a front edge and a back edge, the front and back edges extending longitudinally between the end edges, (c) a platform enclosure comprising a first back wall projecting upwardly and forwardly from said back edge of said platform and side walls projecting upwardly from each end edge of said platform, said first back wall being inclined forwardly with respect to the work platform at an angle in the range of 70° to 80°, (d) a vent passage opening through said first back wall, said vent passage being spaced a substantial distance above said work platform and extending longitudinally of said first back wall along a major portion of the length thereof, (e) an air filter chamber disposed below said work platform and extending longitudinally between the end edges of the platform, said chamber having at least two filter compartments arranged at longitudinally spaced intervals along said chamber, said filter compartments being spaced from one another by an air extraction compartment, each of said filter compartments having an input passage opening therefrom at said back edge of said work platform, said air extraction compartment having a discharge passage opening outwardly therefrom, (f) an air plenum disposed rearwardly from said first back wall and communicating between said vent passage and said input passages of said filter compartments, (g) an air filter unit removably mounted in each filter compartment, each air filter unit having an input end connecting with the input passage of the compartment in which it is housed and an outlet passage communicating with said air extraction compartment, (h) an air extraction unit mounted in said air extraction compartment and operable to extract air from within said platform enclosure through said vent passage and through said filter units in parallel to discharge through said discharge passage of said extraction compartment.

2. A work bench as claimed in claim 1 wherein each of said air filter units includes an electrostatic precipitator.

3. A work bench as claimed in claim 1 wherein each of said air filter compartments has an access passage opening therefrom through which its associated air filter unit can be removed for servicing and an access door mounted on the frame for closing each access passage.

4. A work bench as claimed in claim 1 wherein said first back wall is inclined forwardly with respect to the work platform at an angle in the range of 74° to 77°.

5. A work bench as claimed in claim 1 wherein said work platform has a width between the front edge and the back edge thereof substantially equal to the height of said first back wall.

6. A work bench as claimed in claim 1 wherein said first back wall extends upwardly from said platform to a height (h) at an angle of 75° and said vent passage has an upper edge disposed at a height ($\frac{1}{2}$h) and has a height in the plane of the first back wall equal to (1/6h) and a length in the range 2h to 2.5h.

7. A work bend comprising, (a) a frame, (b) a work platform supported by said frame, said work platform having a front to back transverse extent between a front end and a back end thereof and a longitudinal extent between oppositely disposed sides thereof, (c) a platform enclosure disposed above said platform and comprising a first back wall projecting upwardly from the back end of the platform and a pair of oppositely disposed side walls projecting upwardly from opposite sides of the platform, (d) a vent passage opening through said back wall, (e) an air plenum disposed rearwardly from said back wall and communicating with said vent passage, (f) a pair of air filter compartments disposed below said platform and each having a through passage extending in the direction of the transverse extent of said platform, said through passage having an input end at the back end of the platform and an output end at the front end of the platform, the input end of the through passage communicating with said air plenum, (g) an air extraction compartment disposed below said platform and extending between said air filter compartments in the direction of the transverse extent of said platform, said output ends of said air filter compartments communicating with said air extraction compartment, said air extraction compartment having a discharge passage opening outwardly therefrom, (h) an air filter unit mounted in each of said air filter compartments, (i) an air extraction unit mounted in said air extraction compartment and operable to withdraw air from said platform enclosure through said vent passage, said air plenum, and each of said air filter compartments and said air extraction compartment to discharge it through said discharge passage.

* * * * *